(12) United States Patent
Miao (10) Patent No.: US 7,046,716 B1
(45) Date of Patent: May 16, 2006

(54) DUAL-MODE ULTRA WIDEBAND AND WIRELESS LOCAL AREA NETWORK COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 342 days.

(21) Appl. No.: 10/618,876

(22) Filed: Jul. 14, 2003

(51) Int. Cl.
*H04B 1/69* (2006.01)
*H04B 10/08* (2006.01)
*H04J 11/00* (2006.01)

(52) U.S. Cl. .......................... 375/130; 398/49; 370/208
(58) Field of Classification Search ...................... None
See application file for complete search history.

(56) References Cited

U.S. PATENT DOCUMENTS

2002/0114035 A1* 8/2002 Graves et al. ............... 359/128
2002/0159502 A1* 10/2002 Uesugi ........................ 375/130

OTHER PUBLICATIONS

Hansen, Ken; Wireless RF Design Challenges; 2003 IEEE Radio Frequence Integrated Circuits Symposium; pp. 3-7.*
IEEE Std 802.11a, Part 11: Wireless LAN Medium Access Control (MAC) and Physical Layer (PHY) Specifications, High-Speed Physical Layer in the 5 GHz Band, Piscataway, NJ, 1999.

* cited by examiner

*Primary Examiner*—Chieh M. Fan
*Assistant Examiner*—Cicely Ware (57) ABSTRACT

A dual-mode ultra wideband (UWB) and wireless local area network (WLAN) communication transceiver is used to implement two disparate systems of UWB and WLAN communications within a single device. During the UWB mode, the communication transceiver sends and receives the UWB signal at very-high data rate with a relative short transmission range. During the WLAN mode, the communication transceiver sends and receives the WLAN signal at a relative low data rate, but with a longer transmission range. Thereby, trade-off benefits of the dual-mode UWB and WLAN communication transceiver can be mutually utilized to achieve seamless wireless broadband communications between two different standards.

23 Claims, 11 Drawing Sheets

DUAL-MODE ULTRA WIDEBAND AND WIRELESS LOCAL AREA NETWORK COMMUNICATIONS

BACKGROUND

This invention is generally relative to a dual-mode ultra wideband (UWB) and wireless local area network (WLAN) communications.

On Apr. 22, 2002, U.S. Federal Communications Commission (FCC) released the revision of Part 15 of the Commission's rules regarding UWB transmission systems to permit the marketing and operation of certain types of new products incorporating UWB technology. With appropriate technology, UWB devices can operate using spectrum occupied by existing radio service without causing interference, thereby permitting scare spectrum resources to be used more efficiently. The UWB technology offers significant benefits for Government, public safety, businesses and consumers under an unlicensed basis of operation spectrum.

The UWB devices can be classified into three types based on the operating restrictions: (1) imaging systems including ground penetrating radars and wall, through-wall, surveillance, and medical imaging device, (2) vehicular radar systems, and (3) communications and measurement systems. In general, FCC is adapting unwanted emission limits for the UWB devices that are significantly more stringent than those imposed on other Part 15 devices. In other words, FCC limits outdoor use of the UWB device devices to imaging systems, vehicular radar systems and handheld devices. Limiting the frequency bands, which is based on the −10 dB bandwidth of the UWB emission within certain UWB products, will be permitted to operate. For the communications and measurement systems, FCC provides a wide variety of the UWB devices, such as high-speed home and business networking devices as well as storage tank measurement devices under the Part 15 of the Commission's rules subject to certain frequency and power limitations. The UWB devices must operate in the frequency band from 3.1 GHz to 10.6 GHz. The UWB devices should also satisfy by the Part 15.209 limit, which sets emission limits for indoor and outdoor UWB systems, for the frequency band below 960 MHz, and the FCC's emission masks for the frequency band above 960 MHz.

For the indoor UWB communication operation, Table 1 lists the FCC indoor restrictions of the emission masks (dBm) along with the frequencies (GHz).

TABLE 1

| Frequency (MHz) | EIRP (dBm) |
|---|---|
| 0–960 | −41.3 |
| 960–1610 | −75.3 |
| 1610–1990 | −53.3 |
| 1990–3100 | −51.3 |
| 3100–10600 | −41.3 |
| Above 10600 | −51.3 |

The outdoor handheld UWB communication devices are intended to operate in a peer-to-peer mode without restriction on location. However, the outdoor handheld UWB communication devices must operate in the frequency band from 3.1 GHz to 10.6 GHz as well, with an extremely conservative out of band emission masks to address interference with other communication devices. The outdoor handheld UWB communication devices are permitted to emit at or below the Part 15.209 limit in the frequency band below 960 MHz. The emissions above 960 MHz for the outdoor handheld UWB communication devices must conform to the following emission masks as shown in Table 2:

TABLE 2

| Frequency (MHz) | EIRP (dBm) |
|---|---|
| 0–960 | −41.3 |
| 960–1610 | −75.3 |
| 1610–1900 | −63.3 |
| 1900–3100 | −61.3 |
| 3100–10600 | −41.3 |
| Above 10600 | −61.3 |

FCC proposed to define a UWB device as any device where the fractional bandwidth is greater than 0.25 based on the formula as follows:

$$FB = 2\left(\frac{f_H - f_L}{f_H + f_L}\right), \quad (1)$$

where $f_H$ and $f_L$ are the upper and lower frequencies of the −10 dB emission points, respectively. The center frequency of the UWB transmission is defined as the average of the upper and lower −10 dB points. That is $$F_C = \frac{f_H - f_L}{2}. \quad (2)$$

In addition, a minimum bandwidth of 500 MHz must be used for indoor and outdoor UWB devices regardless of center frequency.

The indoor UWB communication devices must be designed to ensure that operation can only occur indoor according to the indoor emission masks in Table 1. The outdoor handheld UWB communication devices that may be employed for such activities as peer-to-peer operation must be designed according to the outdoor emission masks in Table 2. Both of the indoor and outdoor UWB communication devices can be used for wireless communications, particularly for short-range high-speed data transmissions suitable for broadband access to networks.

UWB communication transceiver for the indoor and outdoor operation can transmit and receive UWB signals by using one channel and/or up to 11 channels in parallel according to some embodiments of the present invention. Each channel of the UWB communication transceiver has a frequency bandwidth of 650 MHz that can transmit 40.625 Mega bits per second (Mbps). That is, a total of 11 channels are able to transmit 446.875 Mbps. The UWB communication transceiver also employs the orthogonal spread codes for all the channels. With 16 pseudorandom noise (PN) spread sequence codes for each bit, each channel achieves 650 Mega chips per second (Mcps). The UWB communication transceiver for the indoor and outdoor operation can transmit and receive the chip data rate up to 7.150 Giga chips per second (Gcps).

WLAN 802.11a is an IEEE standard for wireless LAN medium access control (MAC) and physical layer (PHY) specification and is also referred to as the high-speed physical layer in the 5 GHz band. The WLAN 802.11a standard specifies a PHY entity for an orthogonal frequency division multiplexing (OFDM) system. The radio frequency LAN communication system is initially aimed for the lower band of the 5.15–5.35 GHz and the upper band of the 5.725–5.825 GHz unlicensed national information structure (U-NII) bands, as regulated in the United States by the code of Federal Regulations under Title 47 and Section 15.407. The WLAN 802.11a communication system provides the data payload rate of 6, 9, 12, 18, 24, 36, 48 and 54 it/s Mbps. Also, the WLAN 802.111a communication system supports the transmitting and receiving at data rate of 6, 12, and 24 Mbps with mandatory. The WLAN 802.111a communication system uses 52 subcarriers with modulation of using binary or quadrature phase shift keying (BPSK/QPSK), 16-quadrature amplitude modulation (QAM), or 64-QAM. The forward error correction coding (FEC) of convolutional encoding is used with a coding rate of ½, ⅔, or ¾.

The UWB communication transceiver can achieve the transmission distance in a range of 3 meters to 10 meters since the UWB communication transceiver has to transmit the data with very-low power due to the restriction of FCC emission limitation for the indoor and outdoor operation. The UWB communication transceiver can transmit and receive a very-high data rate in the range from 40.625 to 446.875 Mbps according to some embodiments of the present invention. On the other hand, the WLAN 802.111a communication system can only transmit and receive the data rate in a range from 6 to 54 Mbps, but with a longer transmission distance up to 100 meters.

Since the UWB communication transceiver for the indoor and outdoor operation can transmit and receive the very-high data rate with the short-distance while the WLAN 802.111a communication system can transmit and receive the data up to a much longer distance than the UWB device, but has a lower transmission data rate for the device. Therefore, developing a dual-mode transceiver of the UWB communication system for the indoor and outdoor operation and the WLAN 802.11a communication system is very important since trade-offs of the transmission distance and data rate between the UWB and the WLAN 802.11a transceiver can be mutually utilized for benefits. This allows the UWB and WLAN 802.11a transceiver with co-existence in an environment.

Thus, there is a continuing need for a dual-mode UWB and WLAN 802.11a transceiver that operates using more than one standard and enables a user to use the same communication device in areas in which operate under different standards for the short-range wireless broadband communications.

SUMMARY

In accordance with one aspect, the dual-mode ultra wideband and wireless local area network transceiver includes a digital lowpass-shaping filter system coupled to a ultra wideband multichannel pseudorandom noise sequence mapping or coupled to a wireless local area network inverse fast Fourier transform and image/quadrature modulation, a dual-mode sampling frequency rate coupled to a digital-to-analog converter, and a switch to connect from the ultra wideband multichannel pseudorandom noise sequence mapping or the wireless local area network inverse fast Fourier transform and image/quadrature modulation to the digital lowpass-shaping filter system.

Other aspects are set forth in the accompanying detailed description and claims.

DETAILED DESCRIPTION

Some embodiments described herein are directed to a dual-mode UWB AND WLAN 802.11a communication transceiver. The dual-mode UWB and WLAN 802.11a communication transceiver may be implemented in hardware, such as in an Application Specific Integrated Circuits (ASIC), digital signal processor, field programmable gate array (FPGA), software, or a combination of hardware and software.

Figure 1:
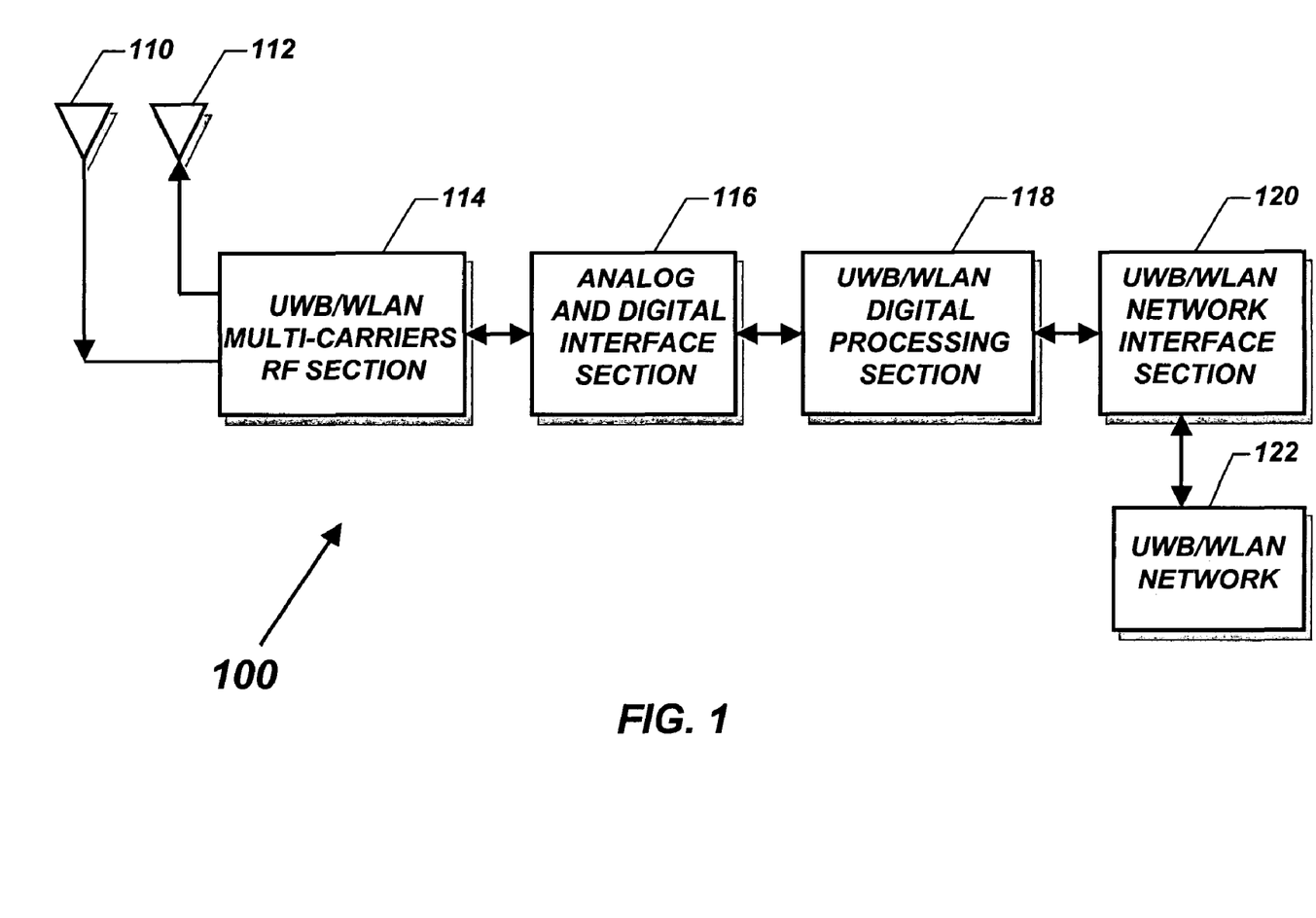
FIG. 1 is a block diagram of one embodiment of a dual-mode UWB and WLAN 802.11a communication transceiver for wireless broadband communication in accordance with the present invention.

FIG. 1 illustrates the dual-mode UWB and WLAN 802.11a communication transceiver 100 in accordance with one embodiment of the present invention. This dual-mode UWB and WLAN 802.11a communication transceiver 100 includes a dual-mode UWB and WLAN multi-carrier RF section 114 that receives and/or transmits multichannel UWB and WLAN 802.11a signals from an antenna 110 or to an antenna 112. The dual-mode UWB and WLAN multi-carrier RF section 114 is connected with an analog and digital interface section 116 that contains analog-to-digital (A/D) and digital-to-analog (D/A) converters. The analog and digital interface section 116 is coupled to an UWB and WLAN 802.11a digital processing section 118, which performs dual-mode multichannel digital transmission and receiver filtering, rake processing, OFDM, channel estimator, spread/de-spread processing, interleave/de-interleave, and encoder/decoder processing. The UWB and WLAN 802.111a digital processing section 118 has an interface with a UWB or WLAN 802.11a network interface section 120 in which is coupled to a UWB or WLAN 802.11a network 122. In accordance with one embodiment of the present invention, the transceiver 100 is the so-called dual-mode UWB and WLAN 802.11a communication transceiver that can both transmit and receive speech, audio, images and video and data information for the indoor and/or outdoor wireless broadband communications.

Figure 2:
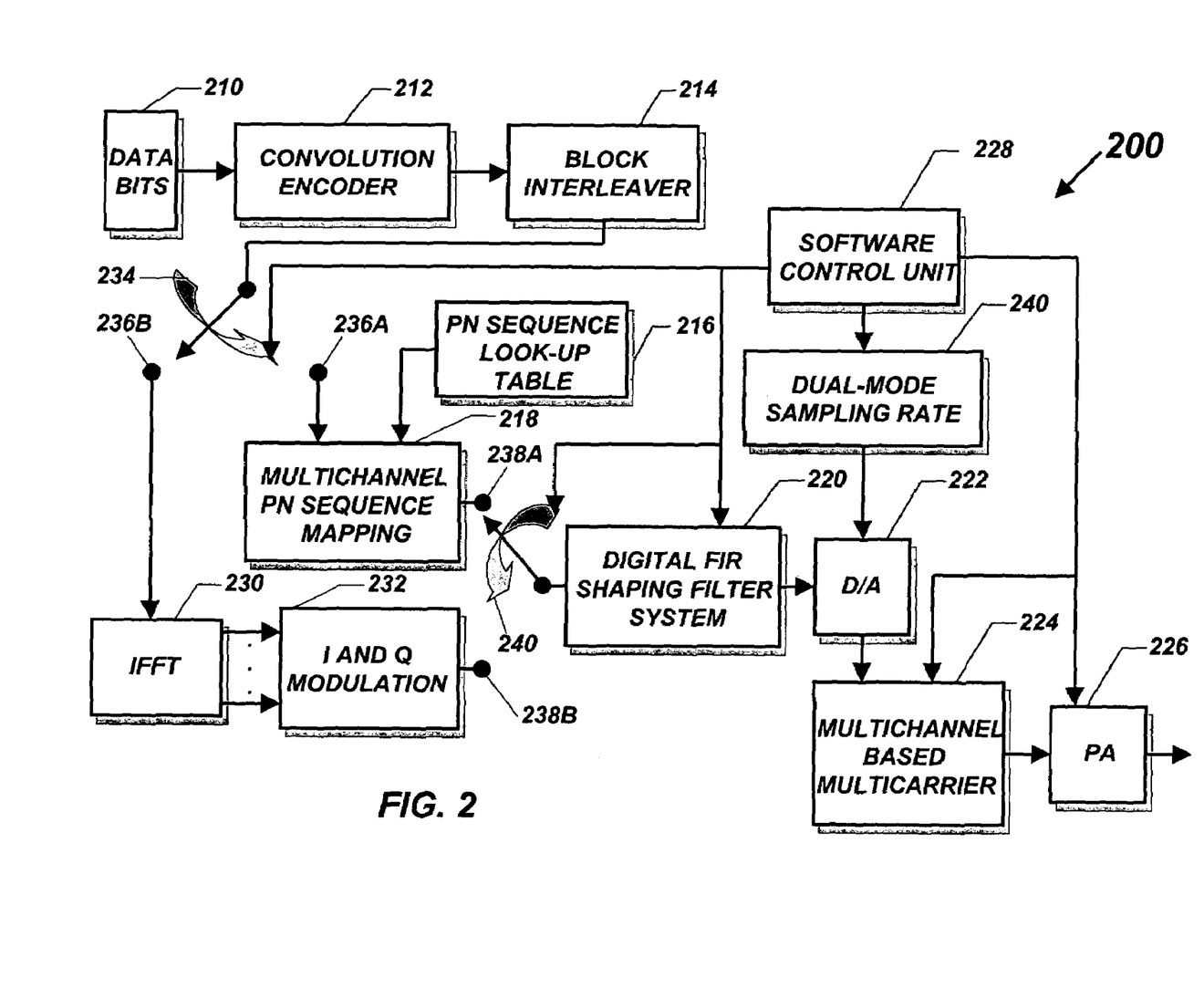
FIG. 2 is a block diagram of showing a dual-mode UWB and WLAN 802.11a communication transmitter according to some embodiments.

FIG. 2 is a block diagram of showing a dual-mode transmitter of the indoor and/or outdoor UWB and WLAN 802.11a communication transceiver 200 according to some embodiments. The transmitter system of the dual-mode UWB and WLAN 802.11a transceiver 200 is able to transmit either the UWB for indoor or outdoor signals with a very-high data rate in the range of 3–10 meters or the WLAN 802.11a signals with lower data rate in a longer range up to 100 meters.

During the UWB mode, the UWB transmitter 200 receives user data bits 210 with information data rate at 223.4375 Mbps. The information data bits 210 are passed through a ½-rate convolution encoder 212 that may produce the double data rate of 446.875 Mbps by adding redundancy bits. The bit data is then interleaved by using a block interleaver 214. A switch 234 is connected to a position of 236A under a software control unit 228. Then, the output bits of the block interleaver 214 are formed 11 multichannels by using a multichannel PN sequence mapping 218. The bit data rate of each channel is about 40.625 Mbps. The multichannel PN sequence mapping 218 is used to perform spreading for one bit data with 16 orthogonal spread sequence chips and to produce 650 Mcps for each channel under the software control unit 228. A PN sequence look-up table 216 provides the unique orthogonal sequences for each channel spreading. A switch 240 that is controlled by using the software control unit 228 is connected with a position 238A. Then chip data of each channel is sequentially passed through an outdoor digital lowpass shaping finite impulse response (FIR) filter system 220 to limit the frequency bandwidth with 650 MHz for each channel signal. Each channel signal is passed through a D/A converter 222, which has the 6-bit resolution and sampling frequency rate of 1 GHz provided by a dual-mode sampling rate 240. The software control unit 228 controls the dual-mode sampling rate 240. The output chip data of each channel from the D/A converter 222 is then modulated with a multi-carrier by using a multichannel-based multi-carrier 224 with controlling from the software control unit 228. Thus, the output analog signals of the multichannel-based multi-carrier 224 are passed a power amplifier (PA) 226 through an antenna into air.

During the WLAN 802.11a mode, the WLAN 802.11a transmitter 200 receives user data bits 210, which are passed through a ½-rate, ⅔-rate or ¾-rate convolution encoder 212 that may produce 2-times or 3/2-times or 4/3-times data rate by adding redundancy bits. The symbol bit data is then interleaved by using the interleaver unit 214. The switch 234, which is controlled by using the software control unit 228, is connected to a position 236B. Then, the output bits of the interleaver unit 214 are formed the data in parallel to be used for a 64-point IFFT unit 230. The output of the 64-point IFFT unit 230 is performed for an image/quadrature (I/Q) modulation 232. The switch 240 that is controlled by using the software control unit 228 is connected with a position 238B. Then output data of the I/Q modulation 232 is passed through the digital lowpass shaping FIR filter system 220 to limit the frequency bandwidth with 20 MHz for the channel signal. The channel signal is passed through the D/A converter 222, which has the 6-bit resolution and the oversampling frequency rate of 480 MHz provided by the dual-mode sampling rate 240. The software control unit 228 controls the dual-mode sampling rate 240. The output from the D/A converter 222 is then modulated with a multi-carrier by using the multichannel-based multi-carrier 224 with controlling from the software control unit 228. Thus, the output analog signals of the multichannel-based multi-carrier 224 are passed the power amplifier 226 through an antenna into air.

Figure 3:
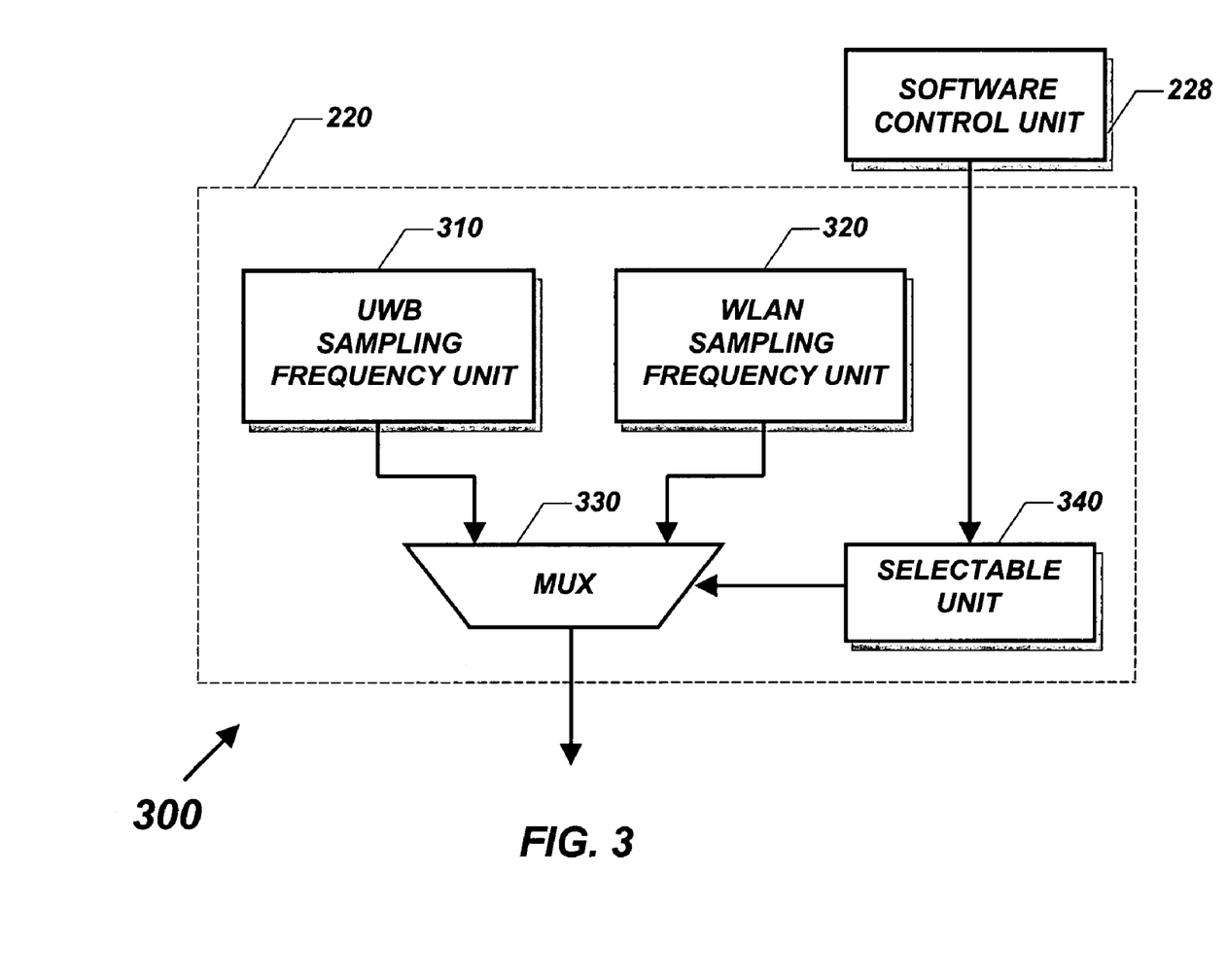
FIG. 3 is a block diagram of showing a dual-mode UWB and WLAN 802.11a sampling frequency rate for a common digital-to-analog (D/A) converter according to some embodiments.

Referring to FIG. 3 is a detailed block diagram 300 of showing the dual-mode sampling frequency rate 220 according to some embodiments. A UWB sampling frequency unit 310 supports the sampling rate at 1 GHz while a WLAN sampling frequency unit 320 provides over-sampling rate of 480 MHz for the use in the D/A converter 222 of FIG. 2. During the UWB mode, a MUX unit 330, which is controlled by using a selectable unit 340, passes through the UWB sampling frequency unit 310 as the output-sampling rate. During the WLAN mode, the MUX unit 330 passes through the WLAN sampling frequency unit 320 as the output-sampling rate. Thus, the D/A converter 222 operates under controlling the sampling frequency rate either with UWB of 1 GHz or with WLAN of 480 MHz. The software control unit 228 controls the selectable unit 340.

Figure 4:
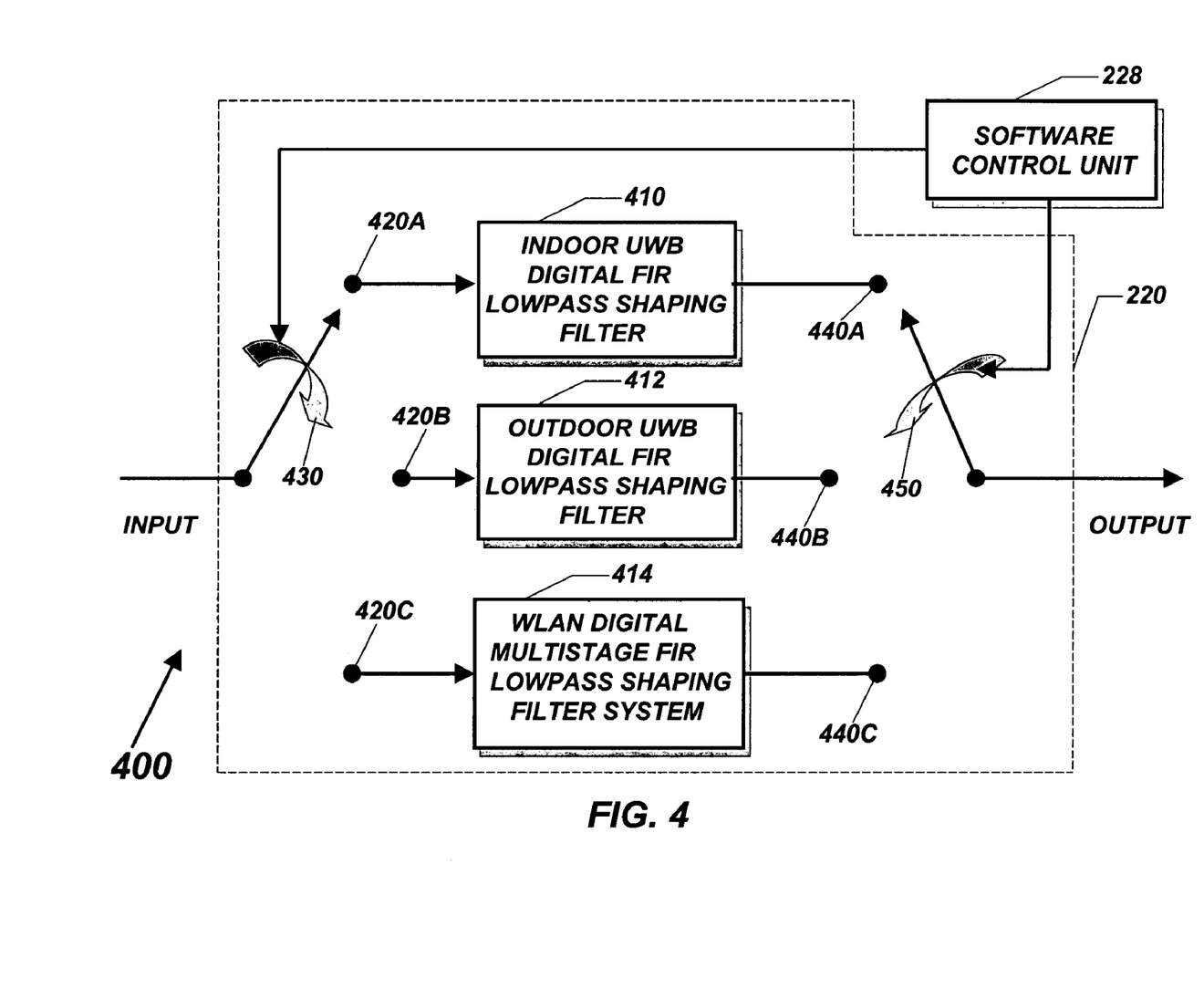
FIG. 4 is a block diagram of showing a dual-mode digital transmission lowpass-shaping FIR filter system for the indoor and outdoor UWB and WLAN 802.11a communication transmitter according to some embodiments.

Referring to FIG. 4 is a detailed block diagram 400 of showing a dual-mode digital lowpass shaping FIR filter system 220 for the UWB and WLAN 802.11a according to some embodiments. During the UWB mode, there is an indoor or outdoor operation. If the indoor operation is used, a switch 430 is connected to a position 420A and a switch 450 is connected to a position 440A. Thus, the indoor UWB digital lowpass shaping FIR filter 410 is used for the UWB indoor transmitter. If the outdoor operation is used, the switch 430 is connected to a position 420B and the switch 450 is connected to a position 440B. Thus, the outdoor UWB digital lowpass shaping FIR filter 412 is used for the UWB outdoor transmitter. During the WLAN 802.11a mode, the switch 430 is connected to a position 420C and the switch 450 is connected to a position 440C. In this case, the WLAN digital multistage lowpass shaping FIR filter 414 is used for the WLAN 802.11a transmitter. Using the software control unit 228 controls both the switches 430 and 450.

Figure 5:
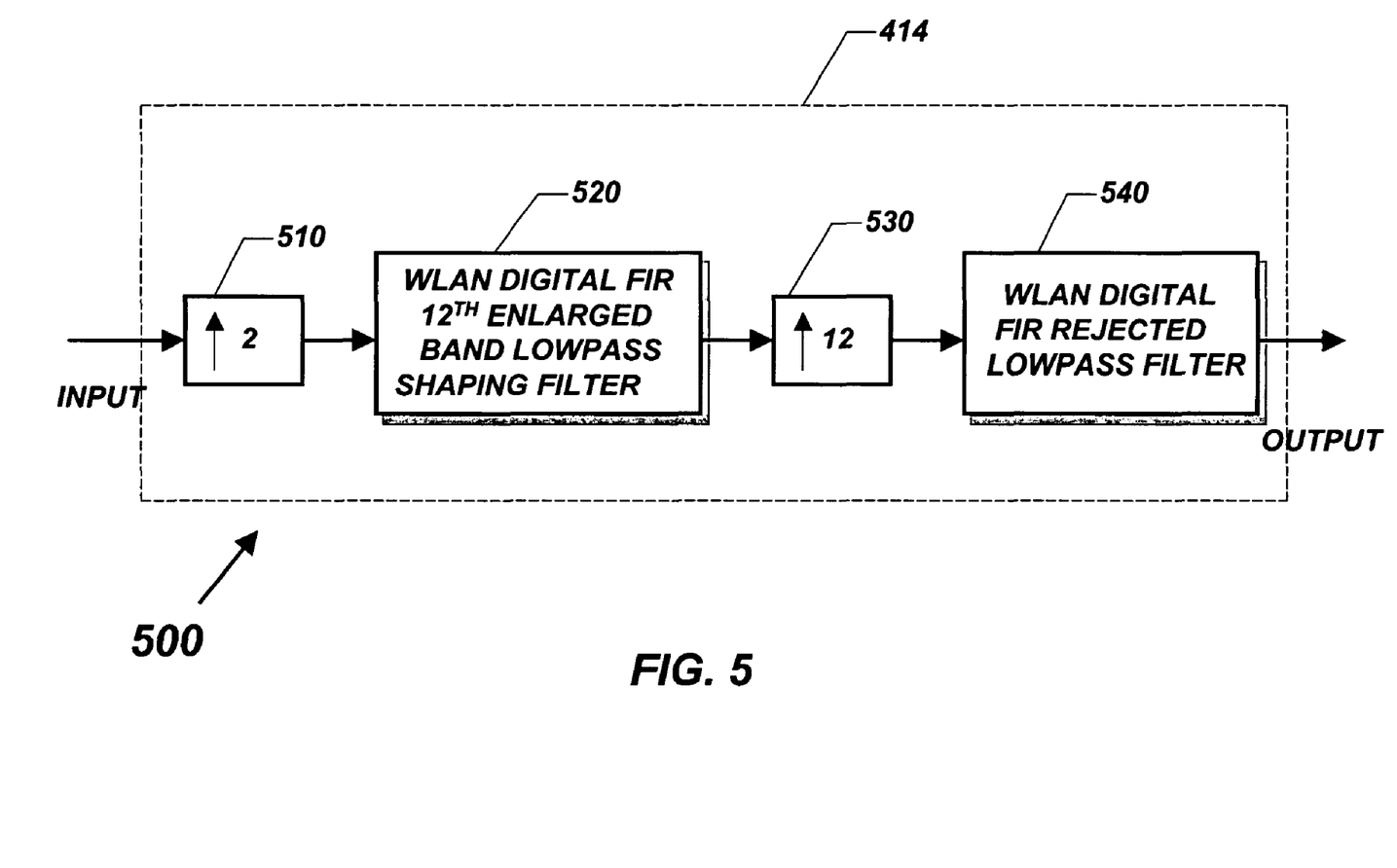
FIG. 5 is a block diagram of showing one embodiment of the WLAN 802.11a digital transmission lowpass-shaping FIR interpolation filter of the present invention.

Referring to FIG. 5, which is a detailed block diagram 500 of showing an embodiment of the WLAN digital multistage lowpass shaping FIR filter 414. This is a multistage interpolation-shaping filter with upsampling of 24 for the WLAN 802.11a transmitting signal. The input signal is first upsampled by 2 by using an upsampling unit 510. The output of the upsampling unit 510 is passed through the WLAN digital $12^{th}$ enlarged band lowpass shaping FIR filter 520. The output of the WLAN digital $12^{th}$ enlarged band lowpass shaping FIR filter 520 is used by upsampling of 12 by using an upsampling unit 530. Then, the output of the upsampling unit 530 is passed through the WLAN digital rejected lowpass FIR filter 540 as the output.

Figure 6:
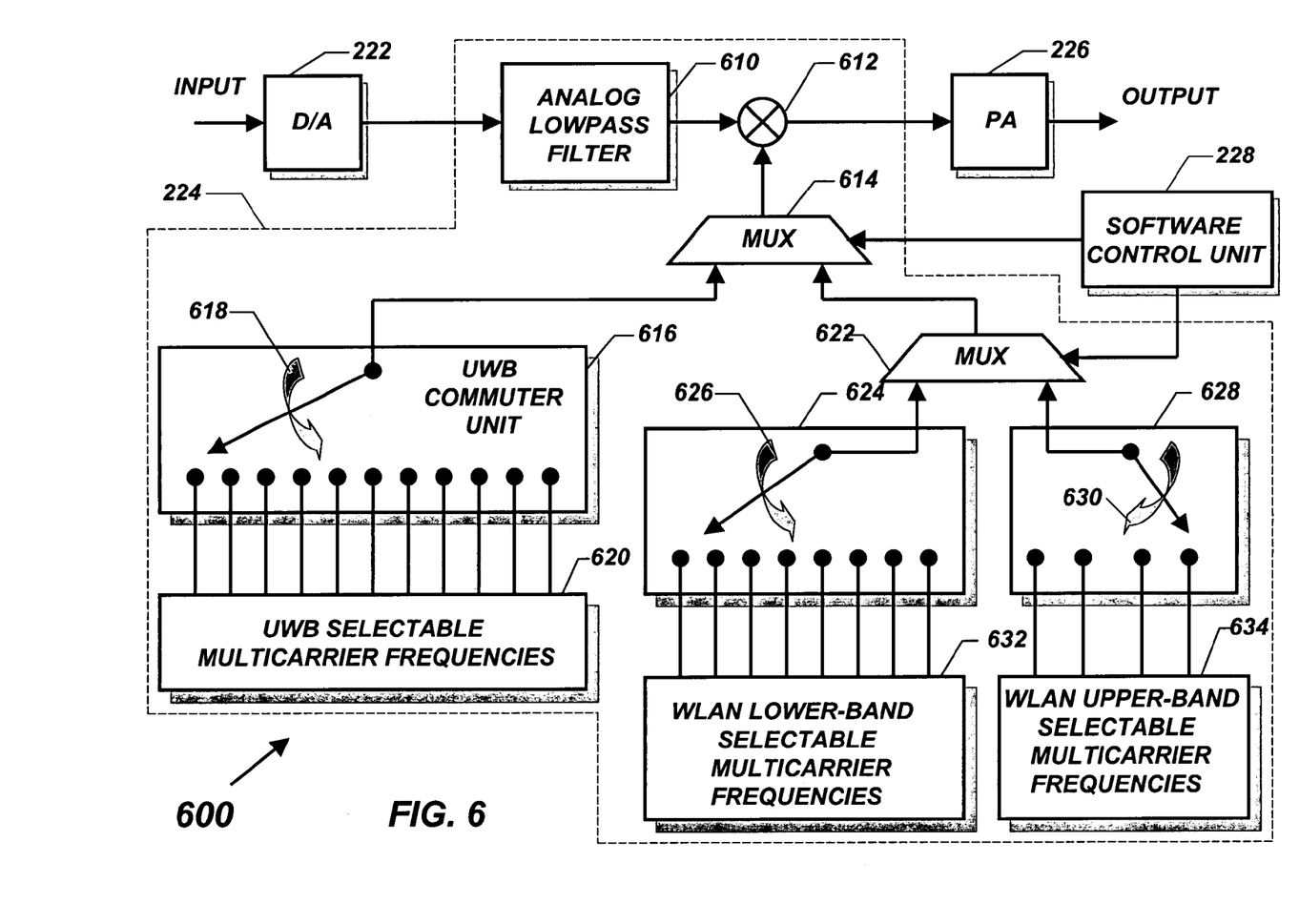
FIG. 6 is a block diagram of showing dual-mode multi-channel-based multi-carrier modulation system according to some embodiments.

Referring to FIG. 6 is a detailed block diagram 600 of showing the dual-mode multichannel-based multi-carrier 224 according to some embodiments. The input digital signal is passed through the D/A converter 222 to produce the analog signal for an analog lowpass filter 610 in which reconstructs and smoothes the signal into time-domain signal. The time-domain signal is multiplied 612 by one of the multi-carriers from a MUX unit 614. Using the software control unit 228 controls the MUX unit 614. During the UWB mode, a commuter unit 616 can select one of the multi-carriers from selectable multi-carrier frequencies 620 by using a switch 618 that is controlled by using the software control unit 228. During the WLAN 802.11a mode, the software control unit 228 controls a MUX 622 to select one of the multi-carriers from either a commuter unit 624 or a commuter unit 628 depending on whether the WLAN lower or upper band selectable multi-carrier frequencies is used for transmitter. A switch 626 is used to connect with one of the positions in the commuter unit 624. A switch 630 is used to connect with one of the positions in the commuter unit 628. Using the software control unit 228 controls the both switches 626 and 630. Then, the time-domain signals with multi-carriers are sequentially passed the power amplifier (PA) 226 through an antenna into air.

Figure 7:
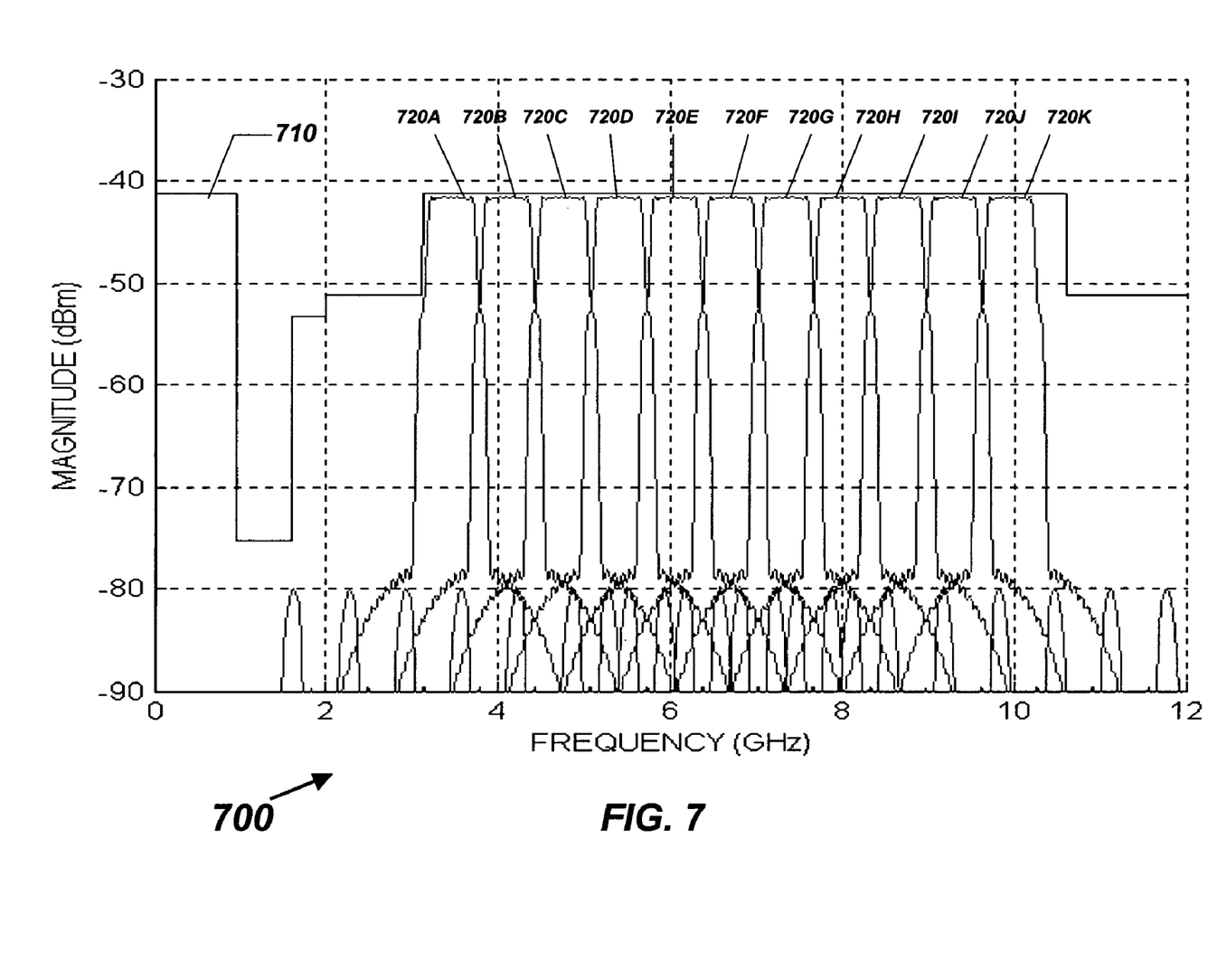
FIG. 7 is a frequency spectrum of including 11 transmitter channels for the indoor UWB transceiver along with the indoor FCC emission mask limitation according to some embodiments.

FIG. 7 is an indoor UWB transmitter output of multi-carrier frequency spectrums (dBm) 700 including 11 transmitter channel spectrums 720A–720K along with the indoor FCC emission limitation 710 according to some embodiments. Each channel frequency bandwidth is 650 MHz and is fitted under the indoor FCC emission limitation 710 with different carrier frequencies. The detail positions of each transmitter channel spectrums (dBm) along with the center, lower and upper frequencies (GHz) as well as channel frequency bandwidth (MHz) are listed in Table 3.

TABLE 3

| Label of transmitter channel frequency spectrums | Center Frequency (GHz) | Lower Frequency (GHz) | Upper Frequency (GHz) | Frequency Bandwidth (MHz) |
| --- | --- | --- | --- | --- |
| 720A | 3.45 | 3.125 | 3.775 | 650 |
| 720B | 4.10 | 3.775 | 4.425 | 650 |
| 720C | 4.75 | 4.425 | 5.075 | 650 |
| 720D | 5.40 | 5.075 | 5.725 | 650 |
| 720E | 6.05 | 5.725 | 6.375 | 650 |
| 720F | 6.70 | 6.375 | 7.025 | 650 |
| 720G | 7.35 | 7.025 | 7.675 | 650 |
| 720H | 8.00 | 7.675 | 8.325 | 650 |
| 720I | 8.65 | 8.325 | 8.975 | 650 |
| 720J | 9.30 | 8.975 | 9.625 | 650 |
| 720K | 9.95 | 9.625 | 10.275 | 650 |

Figure 8:
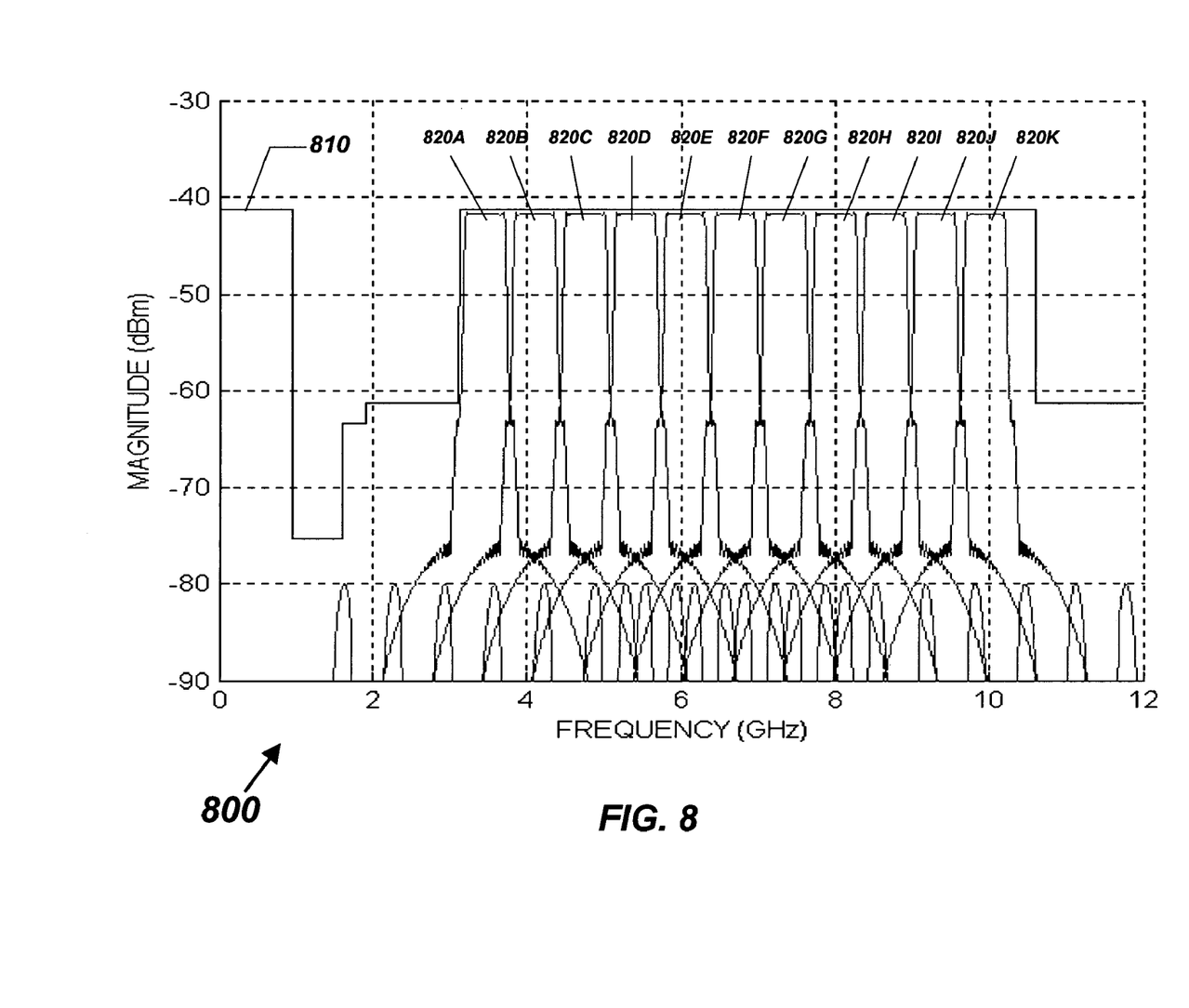
FIG. 8 is a frequency spectrum of including 11 transmitter channel spectrums for the outdoor UWB transceiver along with the outdoor FCC emission mask limitation according to some embodiments.

FIG. 8 is the outdoor UWB output of multi-carrier frequency spectrums (dBm) 800 including 11 transmitter channel spectrums 820A–820K along with the outdoor FCC emission limitation 810 according to some embodiments. Each channel frequency bandwidth is 650 MHz and is fitted under the outdoor FCC emission limitation 810 with different carrier frequencies. The detail positions of each transmitter channel spectrums (dBm) along with the center, lower and upper frequencies (GHz) as well as channel frequency bandwidth (MHz) are also showed in Table 3, where the label of transmitter channel frequency spectrums are from 820A, . . . 820J, and 820K.

Figure 9:
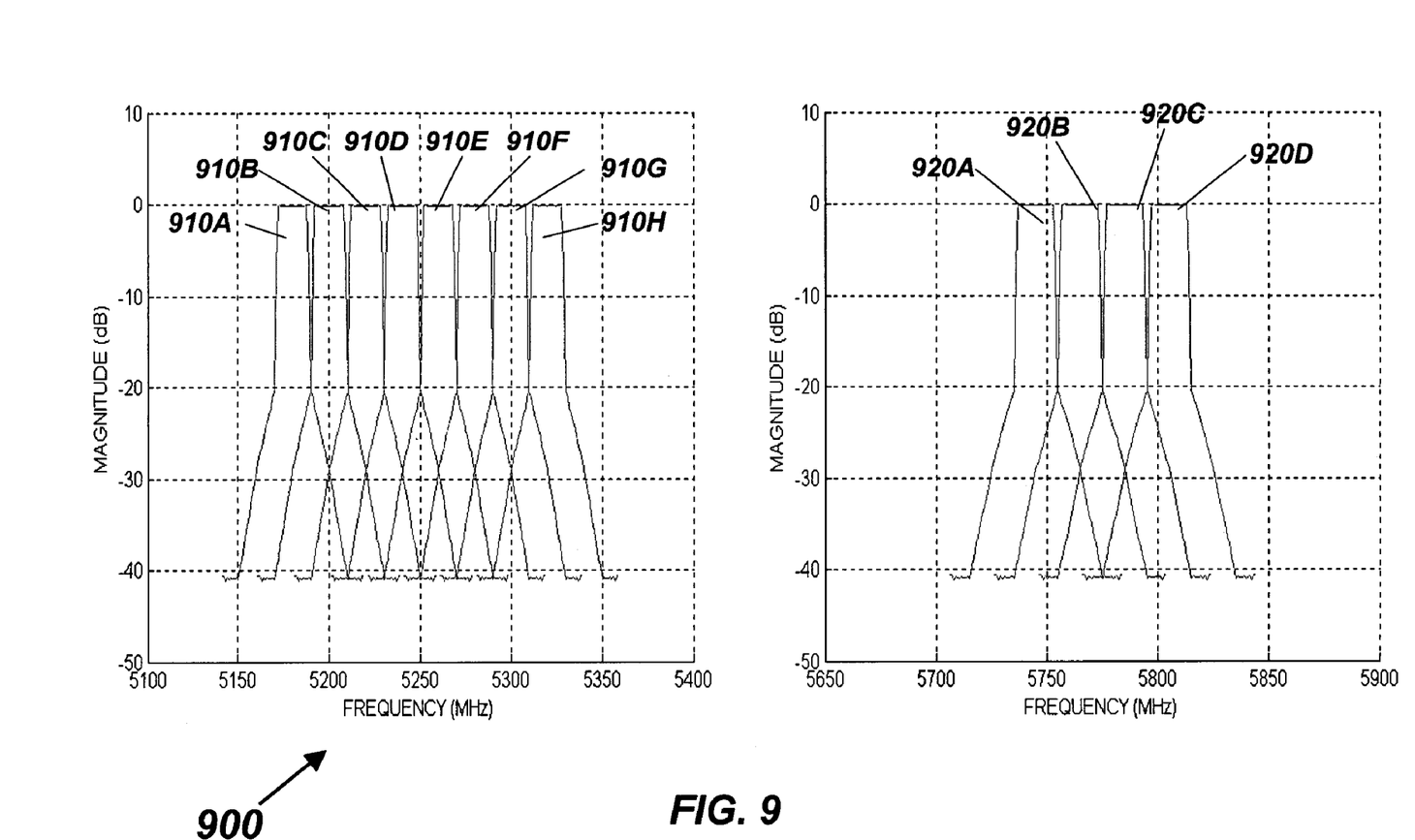
FIG. 9 is two frequency spectrums of including 8 transmitter channels and 4 transmitter channels of the WLAN 802.11a for the lower and upper bands, respectively.

FIG. 9 is the WLAN 802.11a output of multi-carrier frequency spectrum (dB) 900 including 8 lower transmitter spectrums 910A–910H and 4 upper transmitter spectrums 920A–920D according to some embodiments. Each channel frequency bandwidth is 20 MHz. The detail positions of each transmitter channel spectrums (dB) along with the center, lower and upper frequencies (GHz) as well as channel frequency bandwidth (MHz) are listed in Table 4.

TABLE 4

| Label of transmitter channel frequency spectrums | Center Frequency (MHz) | Lower Frequency (MHz) | Upper Frequency (MHz) | Frequency Bandwidth (MHz) |
| --- | --- | --- | --- | --- |
| 910A | 5180 | 5170 | 5190 | 20 |
| 910B | 5200 | 5190 | 5210 | 20 |
| 910C | 5220 | 5210 | 5230 | 20 |
| 910D | 5240 | 5230 | 5250 | 20 |
| 910E | 5260 | 5250 | 5270 | 20 |
| 910F | 5280 | 5270 | 5290 | 20 |
| 910G | 5300 | 5290 | 5310 | 20 |
| 910H | 5320 | 5310 | 5330 | 20 |
| 920A | 5745 | 5735 | 5755 | 20 |
| 920B | 5765 | 5755 | 5775 | 20 |
| 920C | 5785 | 5775 | 5795 | 20 |
| 920D | 5805 | 5795 | 5815 | 20 |

Figure 10:
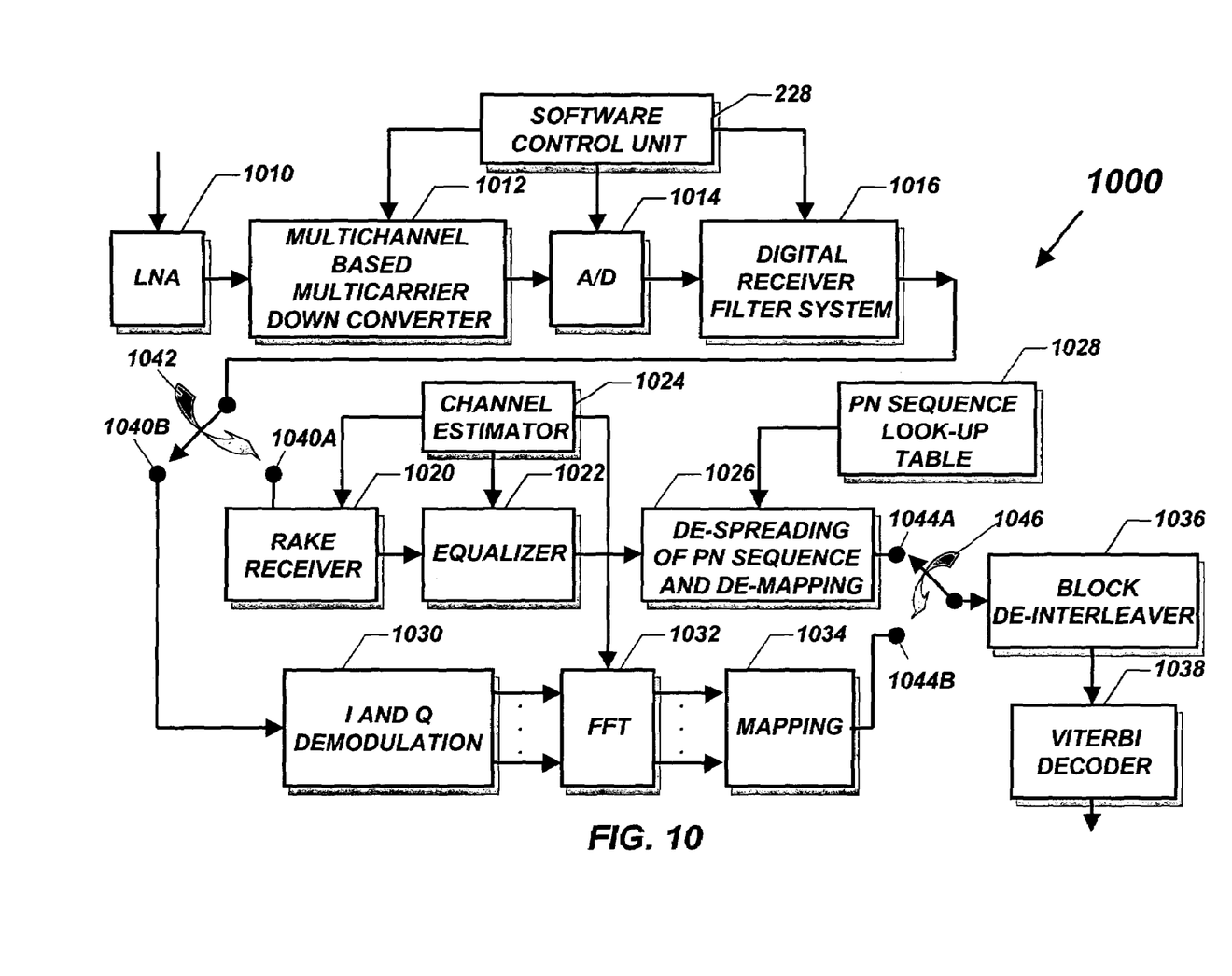
FIG. 10 is a block diagram of showing a dual-mode UWB and WLAN 802.11a communication receiver according to some embodiments.

FIG. 10 is a block diagram of showing a dual-mode UWB WLAN 802.11a communication receiver 1000 according to some embodiments. This dual-mode UWB WLAN 802.11a communication receiver 1000 can deal with the signals either in UWB or in WLAN 802.11a.

During the UWB mode, a low noise amplifier (LNA) 1010, which is coupled to a multichannel-based multi-carrier down converter 1012, receives the UWB signals from an antenna. The output of LNA 1010 is passed through the multichannel-based multi-carrier down converter 1012 to produce the baseband signal for an A/D converter 1014, with 6-bit resolution and sampling frequency rate at 1 GHz. The software control unit 228 controls the multichannel-based multi-carrier down converter 1012, the A/D converter 1014 and a dual-mode digital receiver filter system 1016. The bandlimited UWB analog signals are then sampled and quantized by using the A/D converter 1014. The digital signals of the output of the A/D converter 1014 are filtered by using an digital receiver lowpass filter 1016 to remove the out of band signals. A switch 1042, which is also controlled by using the software control unit 228, is connected to a position 1040A. Thus, the output data of the digital receiver lowpass filter 1016 is used for a rake receiver 1020. The rake receiver 1020 calculates correlation between the received UWB signals and the channel spread sequences and performs coherent combination. The output of the rake receiver 1020 is passed to an equalizer 1022 to eliminate inter-symbol interference (ISI) and inter-channel interference (ICI). A channel estimator 1024 is used to estimate the channel phase and frequency that are passed into the rake receiver 1020 and the equalizer 1022. Then, the output of the equalizer 1022 produces the signals for a de-spreading of PN sequence and de-mapping 1026 to form the UWB signals of bit rate at 446.875 Mbps. A switch 1046 is connected to a position 1044A. Thus, the bit data is de-interleaved by using a block de-interleaver 1036. The output data of the block de-interleaver 1036 is used for the Viterbi decoder 1038 to decode the encoded data and to produce the information data bits at 223.4375 Mbps.

During the WLAN 802.11a mode, the low noise amplifier (LNA) 1010, which is coupled to the multichannel-based multi-carrier down converter 1012, receives the WLAN 802.111a signals from an antenna. The output of LNA 1010 is passed through the multichannel-based multi-carrier down converter 1012 to produce the baseband signal for the A/D converter 1014, with 6-bit resolution and sampling frequency rate at 480 MHz. The software control unit 228 controls the multichannel-based multi-carrier down converter 1012, the A/D converter 1014 and the dual-mode digital receiver filter system 1016. The bandlimited WLAN 802.11a analog signals are then sampled and quantized by using the A/D converter 1014. The digital signals of the output of the A/D converter 1014 are filtered by using the digital receiver lowpass filter 1016 to remove the out of band signals. The switch 1042, which is also controlled by using the software control unit 228, is connected to a position 1040B. Thus, the output data of the digital receiver lowpass filter 1016 is used for an I/Q demodulation 1030. A FFT unit 1032 is used to the output signal of the I/Q demodulation 1030. The output signal of the FFT unit 1032 is converted from parallel signal into serial signal by using a mapping unit 1034. The switch 1046 is connected to a position 1044B. The channel estimator 1024 is used to estimate the channel phase and frequency that are passed for the FFT unit 1032. Then, the bit data is de-interleaved by using the block de-interleaver 1036. The output data of the block de-interleaver 1036 is used for the Viterbi decoder 1038 to decode the user-encoded data.

Figure 11:
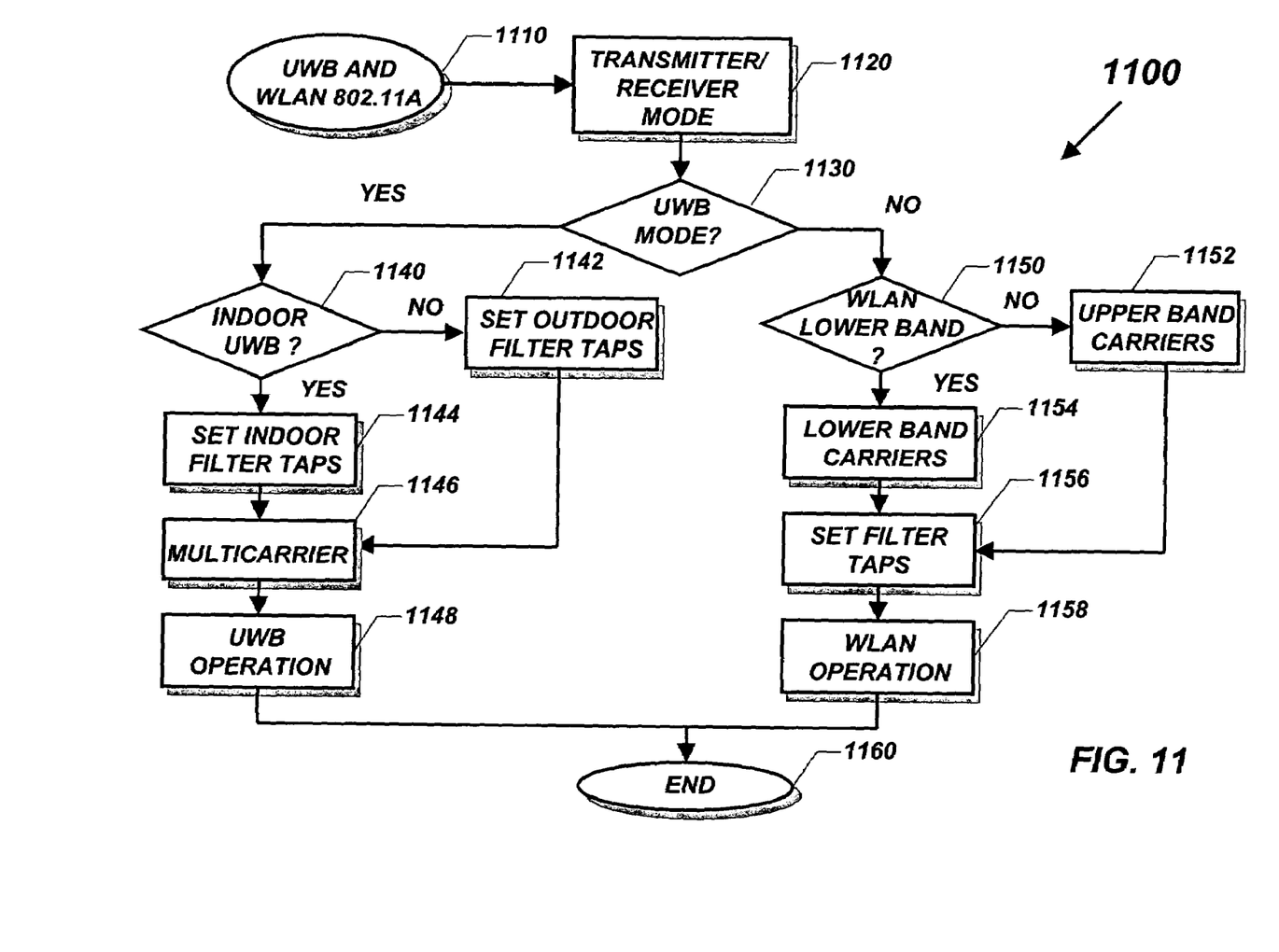
FIG. 11 is a block diagram of showing a flowchart of implementing the dual-mode UWB and WLAN 802.11a communication transceiver according to some embodiments.

FIG. 11 is a block flowchart 1100 of showing the dual-mode UWB and WLAN 802.11a transceiver with transmitter and receiver modes according to some embodiments. A UWB and WLAN 802.11a 1110 is connected with a transmitter and receiver mode 1120, which is also coupled to a UWB mode 1130. In the UWB mode, the indoor UWB 1140 is used to determine whether an indoor UWB mode or an outdoor UWB mode should be used. If the indoor UWB mode is selected, the indoor filters 1144 are used. Otherwise, the outdoor filters 1142 are used. Then, a multicarrier 1146 is determined. Thus, a UWB operation 1148 sets for running entire instructions. In the WLAN 802.11a mode, a WLAN lower band unit 1150 is used to determine whether a lower band carrier or an upper band carrier is used. If the lower band carrier is selected, the lower band carrier is used. Otherwise, the upper band carrier is used. Then, a filter system sets for operation. Thus, a WLAN operation 1158 sets for running entire instructions. An end 1160 is used to finish the program.

While the present inventions have been described with respect to a limited number of embodiments, those skilled in the art will appreciate numerous modifications and variations therefrom. It is intended that the appended claims cover all such modifications and variations as fall within the true spirit and scope of these present inventions.

What is claimed is:

1. A dual-mode ultra wideband and wireless local area network transceiver comprising:
    a digital lowpass-shaping finite impulse response filter system coupled to a ultra wideband multichannel pseudorandom noise sequence mapping or a wireless local area network inverse fast Fourier transform and in-phase/quadrature modulation;
    a dual-mode sampling frequency rate coupled to a digital-to-analog converter, said digital lowpass shaping filter system coupled to said digital to analog converter;
    a switch to connect from the ultra wideband multichannel pseudorandom noise sequence mapping or the wireless local area network inverse fast Fourier transform and in-phase/quadrature modulation to the digital lowpass-shaping filter system.

2. The dual-mode ultra wideband and wireless local area network transceiver of claim 1 wherein said digital lowpass-shaping filter system can be controlled by using said switch to connect said ultra wideband multichannel pseudorandom noise sequence mapping or said wireless local area network inverse fast Fourier transform and image/quadrature modulation.

3. The dual-mode ultra wideband and wireless local area network transceiver of claim 1 wherein said digital lowpass-shaping finite impulse response filter system includes:
    an indoor ultra wideband digital finite impulse response lowpass shaping filter;
    an outdoor ultra wideband digital finite impulse response lowpass shaping filter;
    an wireless local area network digital multistage finite impulse response lowpass shaping filter; and
    controllable switches.

4. The dual-mode ultra wideband and wireless local area network transceiver of claim 3 wherein said digital lowpass-shaping finite impulse response filter system can select to use said indoor ultra wideband digital finite impulse response lowpass shaping filter or said outdoor ultra wideband finite impulse response lowpass shaping filter or said wireless local area network digital multistage finite impulse response lowpass shaping filter by using said controllable switches.

5. The dual-mode ultra wideband and wireless local area network transceiver of claim 3 wherein said wireless local area network digital multistage finite impulse response lowpass shaping filter comprises:
    a first stage of upsampling by M, where M is an integer, and a wireless local area network digital Nth enlarged band lowpass shaping finite impulse response filter; and
    a second stage of upsampling by N, where N is an integer, and a wireless local area network digital rejected lowpass finite impulse response filter, where N is greater than M.

6. The dual-mode ultra wideband and wireless local area network transceiver of claim 5 wherein said wireless local area network digital multistage finite impulse response lowpass shaping filter is a two stage interpolation lowpass shaping finite impulse response filter with upsampling of MN, where M and N are integers.

7. The dual-mode ultra wideband and wireless local area network transceiver of claim 1 wherein the dual-mode sampling frequency rate includes:
    a ultra wideband sampling frequency unit;
    a wireless local area network sampling frequency unit;
    a multiplexing (MUX) unit; and
    a selectable unit.

8. The dual-mode ultra wideband and wireless local area network transceiver of claim 7 wherein said dual-mode sampling frequency rate can be controlled to select either one sampling rate for the ultra wideband mode or other sampling rate for the wireless local area network mode by using said MUX unit with said selectable unit.

9. The dual-mode ultra wideband and wireless local area network transceiver of claim 1 wherein said only one digital-to-analog converter is needed for the dual-mode ultra wideband and wireless local area network transmitter.

10. A dual-mode ultra wideband and wireless local area network multichannel-based multi-carrier system comprising:
    a digital-to-analog converter coupled to an analog lowpass filter that is connected to a mixer;
    the mixer coupled to a power amplifier;
    a ultra wideband selectable multicarrier frequencies connected to a ultra wideband commuter unit in which contains a ultra wideband switch;

a wireless local area network lower-band selectable multicarrier frequencies coupled to a lower-band wireless local area network commuter unit in which contains a lower-band switch;

a wireless local area network upper-band selectable multicarrier frequencies coupled to a upper-band wireless local area network commuter unit in which contains a upper-band switch; and a software control unit selects one of outputs from the ultra wideband commuter unit, the lower-band wireless local area network commuter unit or the upper-band wireless local area network commuter unit to the mixer by controlling MUX (multiplexer) units.

11. The dual-mode ultra wideband and wireless local area network multichannel-based multi-carrier system of claim 10 wherein said software control unit through controlling the ultra wideband switch, the lower-band switch, and the upper-band switch can select a carrier frequency during transmissions from said ultra wideband commuter unit, said lower-band wireless local area network commuter unit or said upper-band wireless local area network commuter unit.

12. The dual-mode ultra wideband and wireless local area network multichannel-based multi-carrier system of claim 10 wherein said digital-to-analog converter coupled to said analog lowpass filter can be used for transmissions either in a ultra wideband mode or in a wireless local area network mode.

13. The dual-mode ultra wideband and wireless local area network multichannel-based multi-carrier system of claim 10 wherein said digital-to-analog converter, said analog lowpass filter, said mixer, said power amplifier, said MUX units, said ultra wideband switch, said lower-band switch, and said upper-band switch are programmable and controllable by using said software control unit.

14. A dual-mode ultra wideband and wireless local area network communication receiver comprising:

an analog-to-digital converter to provide information to a digital receiver filter system;

a pre-switch to provide information to a rake receiver or to an in-phase/quadrature demodulation;

the digital receiver filter system to provide information to the pre-switch;

the rake receiver coupled to a de-spreading of pseudorandom noise sequence and de-mapping;

the in-phase/quadrature demodulation coupled to a fast Fourier transform mapping unit;

a post-switch to provide information to a block de-interleaver; and the de-spreading of pseudorandom noise sequence and de-mapping or the fast Fourier transform mapping unit to provide information to the post-switch.

15. The dual-mode ultra wideband and wireless local area network communication receiver of claim 14 wherein said analog-to-digital converter has B resolution bits, where B is an integer, and controllable sampling frequency rates.

16. The dual-mode ultra wideband and wireless local area network communication receiver of claim 14 wherein said pre-switch is programmable to connect a position with said rake receiver during the ultra wideband mode or to connect a position with said image/quadrature demodulation during the wireless local area network mode.

17. The dual-mode ultra wideband and wireless local area network communication receiver of claim 14 wherein said post-switch is programmable to connect a position with said de-spreading of pseudorandom noise sequence and de-mapping during a ultra wideband receiver mode or to connect a position with said fast Fourier transform mapping during a wireless local area network receiver mode.

18. An article comprising a medium for storing instructions that cause a digital signal processor-based dual-mode ultra wideband and wireless local area network communication system to:

Selectively set a sampling frequency rate for a digital-to-analog converter during an ultra wideband transmitter mode or during a wireless local area network transmitter mode;

Selectively set a connection with ultra wideband multichannel pseudorandom noise sequence mapping or a connection with wireless local area network in-phase/quadrature modulation and inverse fast Fourier transform during either the ultra wideband transmitter mode or during the wireless local area network transmitter mode;

Selectively set a digital lowpass-shaping transmitter filter for the ultra wideband or for the wireless local area network during either the ultra wideband transmitter mode or during the wireless local area network transmitter mode;

Selectively set a use of the multicarrier of the ultra wideband or of the lower and upper wireless local area network during either the ultra wideband transmitter mode or during the wireless local area network transmitter mode;

Selectively set the connection with ultra wideband rake receiver or wireless local area network image/quadrature demodulation and fast Fourier transform; and Selectively set an indoor ultra wideband digital finite impulse response lowpass shaping filter for an indoor ultra wideband operation or an outdoor ultra wideband digital finite impulse response lowpass shaping filter for the outdoor ultra wideband operation.

19. The article of claim 18 further storing instructions that cause the digital signal processor-based dual-mode ultra wideband and wireless local area network transmitter system to select either a ultra wideband sampling frequency rate for the digital-to-analog converter during a ultra wideband mode or the wireless local area network sampling frequency rate for the digital-to-analog converter during the wireless local area network mode.

20. The article of claim 18 further storing instructions that cause the digital signal processor-based dual-mode ultra wideband and wireless local area network transmitter system to control switches to connect with ultra wideband baseband functions of a multichannel pseudorandom noise sequence mapping during a ultra wideband mode or to connect with wireless local area network based functions of the wireless local area network inverse fast Fourier transform and image/quadrature modulation during the wireless local area network mode.

21. The article of claim 18 further storing instructions that cause the digital signal processor-based dual-mode ultra wideband and wireless local area network transmitter system to control switches to connect with the indoor ultra wideband transmitter filter or the outdoor ultra wideband transmitter filter or to connect with the wireless local area network multistage transmitter filter.

22. The article of claim 18 further storing instructions that cause the digital signal processor-based dual-mode ultra wideband and wireless local area network transmitter system to select multicarrier frequencies during the ultra wideband mode or wireless local area network mode.

23. The article of claim 18 further storing instructions that cause the digital signal processor-based dual-mode ultra wideband and wireless local area network receiver system to control the switches to connect with a ultra wideband baseband functions of a rake receiver and de-spread of pseudorandom noise sequence and de-mapping during the ultra wideband mode or to connect with the wireless local area network based functions of the in-phase/quadrature demodulation and mapping during the wireless local area network mode.

* * * * *